United States Patent [19]

Drexel et al.

[11] Patent Number: 4,880,265
[45] Date of Patent: Nov. 14, 1989

[54] ROBOT ARM WITH AN ASSEMBLY FLANGE FOR TOOLS

[75] Inventors: Peter Drexel, Steinenbronn; Hans Erne, Waiblingen; Gerhard Gosdowski, Bietigheim-Bissingen; Karl Gross, Schorndorf; Ulrich Kirsten, Gerlingen; Ernst Leisner, Ditzingen, all of Fed. Rep. of Germany

[73] Assignee: Robert Bosch GmbH, Stuttgart, Fed. Rep. of Germany

[21] Appl. No.: 116,563

[22] PCT Filed: Jan. 10, 1987

[86] PCT No.: PCT/DE87/00007
§ 371 Date: Sep. 30, 1987
§ 102(e) Date: Sep. 30, 1987

[87] PCT Pub. No.: WO87/04653
PCT Pub. Date: Aug. 13, 1987

[30] Foreign Application Priority Data

Jan. 31, 1986 [DE] Fed. Rep. of Germany ....... 3602901
Apr. 25, 1986 [DE] Fed. Rep. of Germany ....... 3613980

[51] Int. Cl.$^4$ .............................................. B25J 17/02
[52] U.S. Cl. .................................... 294/86.4; 901/29; 901/30; 901/41
[58] Field of Search ................... 294/1.1, 86.4, 88; 29/568; 414/729, 730; 901/28–31, 41, 46, 49, 50

[56] References Cited

U.S. PATENT DOCUMENTS

| | | | |
|---|---|---|---|
| 4,512,709 | 4/1985 | Hennekes et al. | 901/41 X |
| 4,636,135 | 1/1987 | Bancon | 901/41 X |
| 4,652,203 | 3/1987 | Nakashima et al. | 901/30 X |
| 4,664,588 | 5/1987 | Newell et al. | 294/86.4 X |
| 4,676,142 | 6/1987 | McCormick et al. | 901/29 X |

FOREIGN PATENT DOCUMENTS 3340912 5/1985 Fed. Rep. of Germany.

Primary Examiner—Johnny D. Cherry
Attorney, Agent, or Firm—Michael J. Striker

[57] ABSTRACT

A robot arm comprises a robot arm unit, and an assembly flange provided with a unit for centering and fastening of tools, the assembly flange being formed as a wall of a housing member fastened to the robot arm element and having an interior space through which line portions for power supply and control on a robot arm element side can pass, the wall having a plurality of sides and being provided on the sides with openings, a plurality of cover plates arranged to cover the openings, at least one of the cover plates being provided with internal connections for the line portions on the robot arm element side, and also being provided with a unit for connecting the internal connections with further elements.

13 Claims, 3 Drawing Sheets

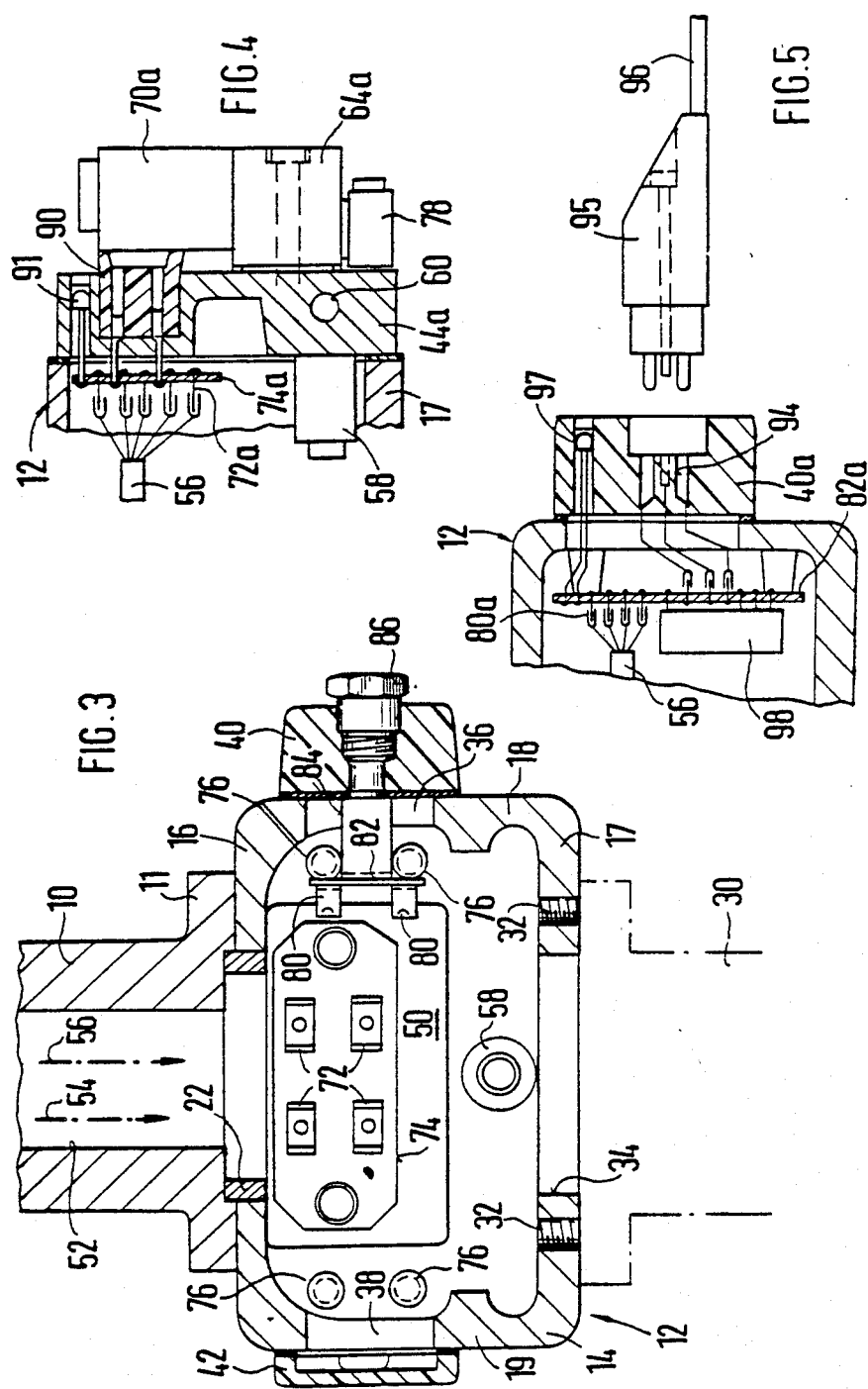

ROBOT ARM WITH AN ASSEMBLY FLANGE FOR TOOLS

BACKGROUND OF THE INVENTION

The invention is based on a robot arm with an assembly flange for tools. In a known robot arm of this generic type (DE-Al 33 40 912), the assembly flange is constructed as a supporting basic element of a gripper exchange system which is matched with the gripper tools used in this system with respect to the mechanical centering and fastening means as well as the line connections for power supply and control and therefore forms a part of a special structural component which is not suitable for the assembly of other tools.

SUMMARY OF THE INVENTION

Accordingly, it is an object of the present invention to provide a robot arm with an assembly flange for tools which avoids the disadvantages of the prior art.

In keeping with these objects and with others which will become apparent hereinafter, one feature of the present invention resides, briefly stated, in a robot arm comprising a robot arm unit, and an assembly flange provided with means for centering and fastening of tools, the assembly flange being formed as a wall of a housing member fastened to the robot arm element and having an interior space through which line portions for power supply and control on a robot arm element side can pass, the wall having a plurality of sides and being provided on the sides with openings, a plurality of cover plates arranged to cover the openings, at least one of the cover plates being provided with internal connections for the line portions on the robot arm element side, and also being provided with means for connecting the internal connections with further elements.

The arrangement, according to the invention, which comprises the above mentioned characterizing features, has the advantage that the assembly flange is connectable with variously designed tools and tool exchange systems for various cases of use of the robot arm, wherein the adaptation is effected only by means of the exchange of standardized, plug-in structural elements and line elements. The assembly flange, according to the invention, is distinguished, in addition, by a construction which is modular, compact and service-friendly.

Advantageous developments of the arrangement according to the main claim are made possible by means of the steps indicated in the subclaims.

In robot arms with pressure medium connections for the power supply of the tools which can be assembled, it is suggested that a cover plate be provided internally with a joint pressure medium connection for a plurality of extending pressure medium line portions which lead over pressure medium valves which are fastened externally at the cover plate and are connected with the internal pressure-medium connection via a distributor duct in the cover plate. In this way it is achieved that only a single pressure medium line is provided until the assembly flange, and the pressure medium valves are arranged directly at the power consumer, resulting in short clock times.

A simple and stable construction of the housing member forming the assembly flange results if this housing member is formed by means of a longitudinal portion of a drawn section with a frame-like rectangular cross section.

BRIEF DESCRIPTION OF THE DRAWING

An embodiment example of the invention is shown in the drawing and explained in more detail in the following description.

FIG. 4 shows a variant of a detail of the embodiment example seen in FIG. 2, and FIG. 5 shows a variant of a detail from FIG. 3.

DESCRIPTION OF THE PREFERRED EMBODIMENT

Figure 1:
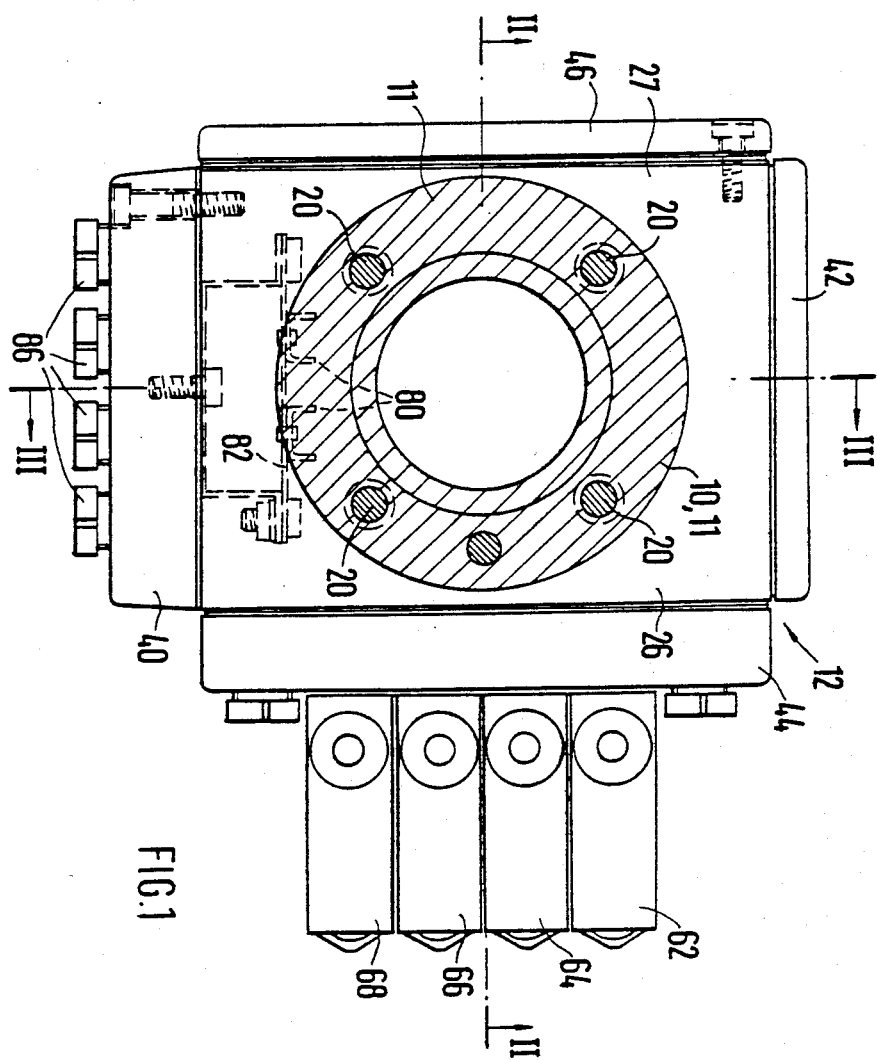
FIG. 1 shows a cross section through the robot arm according to line I—I in FIG. 2, and FIGS. 2 and 3 each show a partial longitudinal section according to lines II—II and III—III in FIG. 1.

A flange 11 is formed at the free end of a robot arm 10. A housing structural component, designated in its entirety by 12, is fastened to the flange 11. The basic element of this housing structural component 12 is a housing member 14 which is formed by means of a longitudinal portion of a drawn section having a frame-like rectangular cross section. The housing member 14 accordingly has a cover wall 16 (FIG. 2), a base wall 17 and two side walls 18, 19 (FIG. 3) which are located opposite one another in pairs so as to be parallel. The cover wall 16 is fastened to the flange 11 by means of screws 20 and fixed in the prescribed position relative to the flange 11 by means of an annular collar 22 and a pin 24. On the other two sides 26, 27, located transversely relative to the drawing direction of the section, the housing member 14 is open, i.e. is provided with openings 28, 29 which correspond to the clear cross sectional section of the drawn housing member 14.

The base wall 17 of the housing member 14 forms an assembly flange for a tool 30, sketchily indicated, or for a basic element of a tool exchange system. For this purpose, the base wall 17 is provided with four threaded boreholes 32, a centering opening 34, and other means for fixing the assembled tool at a suitable angle, which means are not visible in the drawing. Openings 36 and 38 (FIG. 3), which are closed outwardly by means of cover plates 40 and 42 with the intermediary of a seal in each instance, are provided in the vertically upright side walls 18 and 19 of the housing member. The sides 26, 27 of the housing member 14, which sides are open with reference to the section, are closed outwardly by means of cover plates 44, 46 (FIG. 2) with the intermediary of a seal in each instance.

The described arrangement results in a closed interior space 50 in the housing member 14 with a central borehole 52 in the robot arm 10 leading into the closed interior space 50. A pressure medium line 54 for the power supply, which is symbolically indicated by means of a dash-dot line, and a bundle 56 of electrical lines for controlling the assembled tool or tool exchange system extend in the borehole 52, the bundle 56 being indicated in a sketchy manner. The pressure medium line 54 leads to an internal pressure-medium connection 58 (FIG. 2) to the cover plate 44 which is connected with the inputs of four pressure medium valves 62, 64, 66, 68 by means of a branched duct system 60 in the cover plate 44, the four pressure medium valves 62, 64, 66, 68 being fastened externally to the cover plate 44.

The pressure medium valves 62 to 68 have an electromagnetic drive 70 in each instance (FIG. 2) which is triggered and fed via one of the electric lines from the bundle 56. These lines first lead to electric contact plug plates 72 on an insulating plate 74 which is fastened at the cover plate 44 on the inside. In addition, extending lines are connected to the contact plug plates 72, guided through boreholes 76 in the cover plate 44 so as to be insulated and relieved of tension, and connected to connection contacts 77 of the drive 70. Each of the pressure medium valves 62 to 68 has an external pressure medium connection 78, to which are connected the power-transmitting pressure medium lines, which lead to the assembled tool or tool exchange system. The rest of the electric lines from the bundle 56 are guided to electric contact plug plates 80 on an insulating 82 which is connected with the cover plate 40 by webs 84. This cover plate 40 consists of insulating material and carries four electrical connection contacts 86 on the outside, which are individually connected with the inner contact plug plates 80 by means of terminal clamps, not shown. The control lines, which extend to the assembled tool or tool exchange system, are connected to the external connection contacts 86. In the described embodiment example, the two cover plates 42 and 46 only have a protective function for the electric contact connections located in the interior space 50 of the housing member 14.

In the variant according to FIG. 4, a cover plate 44a is provided, which likewise carries a pressure medium connection 58 on the inside and a plurality of pressure medium valves 64a on the outside which are connected to a branched duct system 60 in the cover plate 44a. Each of the pressure medium valves 64a has an electric drive 70a which is connected in each instance with contacts 72a of a printed circuit board 74a by means of a plug-in device which has a plug-in element 90 which is integrated in the cover plate 44a, lines from the bundle 56 being connected to the printed circuit board 74a. An LED indicator 91 is assigned to each plug-in element 90 and is likewise integrated in the cover plate 44a and is contacted via the printed circuit board 74a.

In the variant according to FIG. 5, a plurality of plug-in elements 94 for plugs 95 of extending signal and control lines 96 are integrated in a cover plate 40a, which signal and control lines 96 are contacted by lines from the bundle 56 via a printed circuit board 82a and contacts 80a which are fastened to the latter. An LED indicator 97, which is likewise integrated in the cover plate 40a and contacted via the printed circuit board 82a, is assigned to each plug-in element 94.

Figure 2:
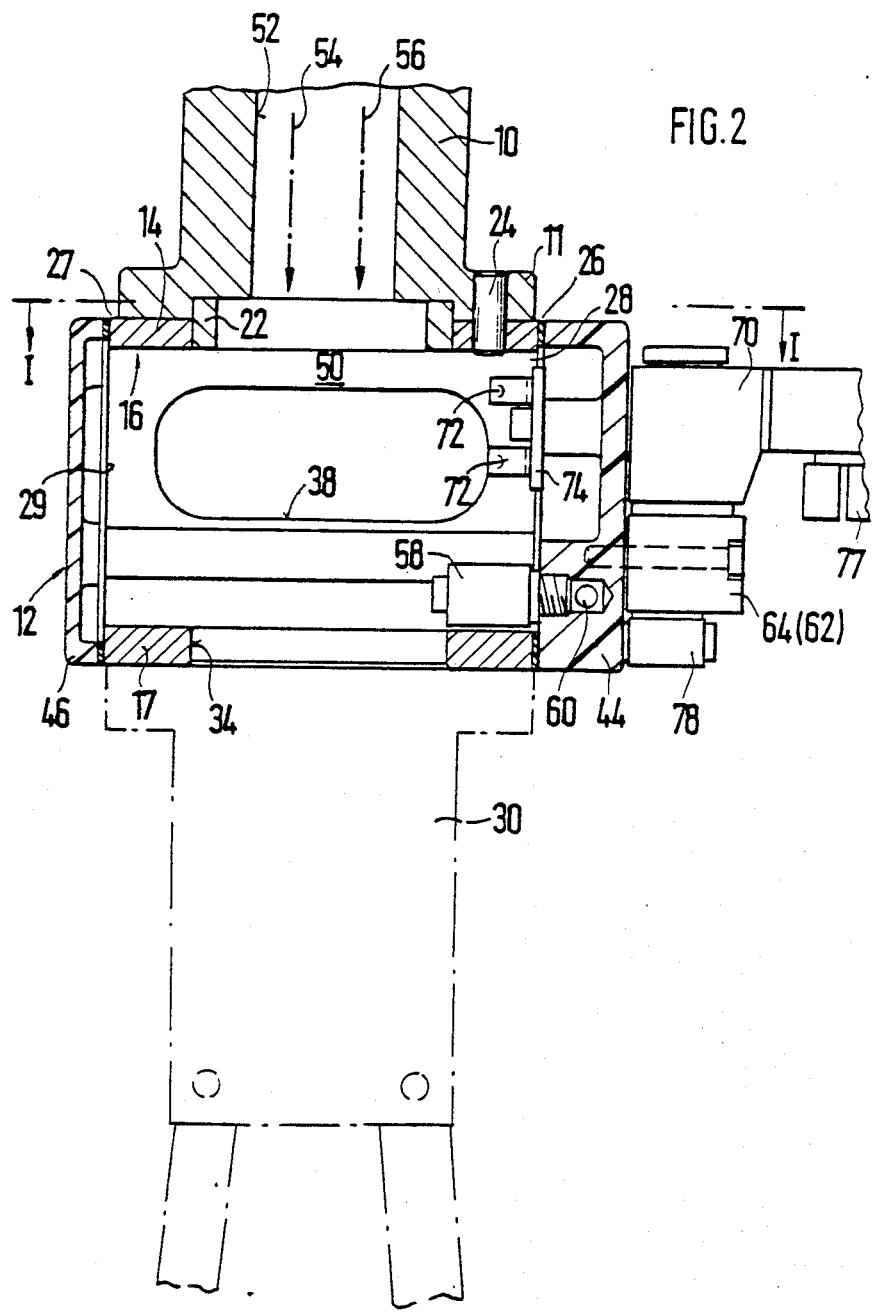

In a construction with continuous lines according to FIGS. 2 and 3, as well as in a construction with plugged-in lines according to FIGS. 4 and 5, electronic elements or components, e.g. analog-to-digital converter, measuring transducer and amplifier, limit monitor, etc., can be assembled on the cover plate 44, 44a or 40, 40a, or to the insulating material plate 74, 82, or printed circuit board 74a, 82a fastened to the cover plate 44, 44a or 40, 40a, for process monitoring or process control of the connected tools and devices. FIG. 5 shows such an element 98 in a symbolic manner which is attached to the printed circuit board 82a. In addition, the printed circuit boards 74a, 82a, the insulating plates 74, 82 or the cover plates 44a, 40a or 44, 40 carrying the latter, can also be provided with plug-in connectors for optical or optical-electrical transmission lines or for opto-electronic and electro-optical converters.

The housing structural component 12 of the robot arm 10, which housing structural component 12 is designed in a modular construction, can easily be adapted to the respective use by means of exchanging the cover plates 40 to 46 or 40a and 44a. The pneumatic and electric connection of the housing structural component 12 to the robot arm 10 is effected via standardized, plug-in lines with a minimal quantity of single cables, wherein the distribution and branching is effected on the printed circuit boards. A high electric protective system (IP54) results from the favorable sealing possibilities. The individual pressure medium valves are easily exchangeable in case of need and result in shorter clock times because of their arrangement directly at the consumer.

It will be understood that each of the elements described above, or two or more together, may also find a useful application in other types of constructions differing from the types described above.

While the invention has been illustrated and described as embodied in a robot arm with an assembly flange for tools, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A robot arm comprising, a robot arm unit; and an assembly flange provided with means for centering and fastening of tools, said assembly flange being formed as a wall of a housing member fastened to said robot arm unit, said housing member having an interior space in which line portions for power supply and control on said robot arm unit can pass, said housing member having a plurality of sides and being provided on said sides with openings; a plurality of cover plates arranged to cover said openings, at least one of said cover plates being provided with internal connections for the line portions, and also being provided with means for manually connecting said internal connections with elements arranged outside said housing member, said at least one cover plate is provided with a joint pressure medium connection for a plurality of pressure medium line portions, said at least one cover plate being also provided with pressure medium valves located outside of said at least one cover plate, said at least one cover plate also having a distributor duct through which said pressure medium valves are connected with at least one of said internal connections.

2. A robot arm as defined in claim 1, wherein said pressure medium valves are formed as electrically actuated pressure medium valves, said at least one cover plate which is provided with said pressure medium valves having internal electric connection contacts for connecting with the line portions on the robot arm unit; and further comprising outside electric valve connections, said line portions extending through said at least one cover plate and being also connected with said electric valve connections.

3. A robot arm comprising, a robot arm unit; and an assembly flange provided with means for centering and fastening of tools, said assembly flange being formed as a wall of a housing member fastened to said robot arm unit, said housing member having an interior space in which line portions for power supply and control on said robot arm unit can pass, said housing member having a plurality of sides and being provided on said sides with openings; a plurality of cover plates arranged to cover said openings, at least one of said cover plates being provided with internal connections for the line portions, and also being provided with means for manually connecting said internal connections with elements arranged outside said housing member; and pressure medium valves, said at least one cover plate also having a distributor duct through which said pressure medium valves are connected with at least one of said internal connections.

4. A robot arm as defined in claim 3, wherein said connecting means includes bushings.

5. A robot arm as defined in claim 3, wherein said connecting means includes integrated plug-in elements.

6. A robot arm as defined in claim 3, wherein said connecting means is formed so as to connect said internal connections with the elements selected from the group consisting of a control element, and a control and signal line.

7. A robot arm as defined in claim 3, wherein said housing member is provided with a cover wall which is arranged at a distance from said wall which forms said assembly flange, so as to be parallel to it, said robot arm unit being provided with an intermediate flange, said cover wall being fastened to said intermediate flange of said robot arm unit.

8. A robot arm as defined in claim 7; and further comprising a carrying flange of a gripper exchange system, said carrying flange being fasteneable to said wall of said housing member.

9. A robot arm as defined in claim 3, wherein said robot arm unit has an end area; and further comprising said line portions on the side of said robot arm unit and extending in an interior of said end area of said robot arm unit.

10. A robot arm as defined in claim 3, wherein said connecting means includes electric plug-in elements for the elements arranged outside said housing member, said electric plug-in elements being integrated in at least one cover plate, said at least one cover plate being provided with internal electric connection contacts arranged to connect said electric plug-in elements with the line portions on the robot arm unit.

11. A robot arm as defined in claim 3; and further comprising an electronic component for process monitoring and control, fastened to said one cover plate.

12. A robot arm as defined in claim 3; and further comprising an electronic element fastened to said at least one cover plate.

13. A robot arm comprising, a robot arm unit; and an assembly flange provided with means for centering and fastening of tools, said assembly flange being formed as a wall of a housing member fastened to said robot arm unit, said housing member having an interior space in which line portions for power supply and control on said robot arm unit can pass, said housing member having a plurality of sides and being provided on said sides with openings; a plurality of cover plates arranged to cover said openings, at least one of said cover plates being provided with internal connections for the line portions, and also being provided with means for manually connecting said internal connections with elements arranged outside said housing member, said at least one cover plate is provided with a joint pressure medium connection for a plurality of pressure medium line portions; and pressure medium valves, said at least one cover plate also having a distributor duct through which said pressure medium valves are connected with at least one of said interior connections.

* * * * *